United States Patent Office 2,843,859
Patented July 22, 1958

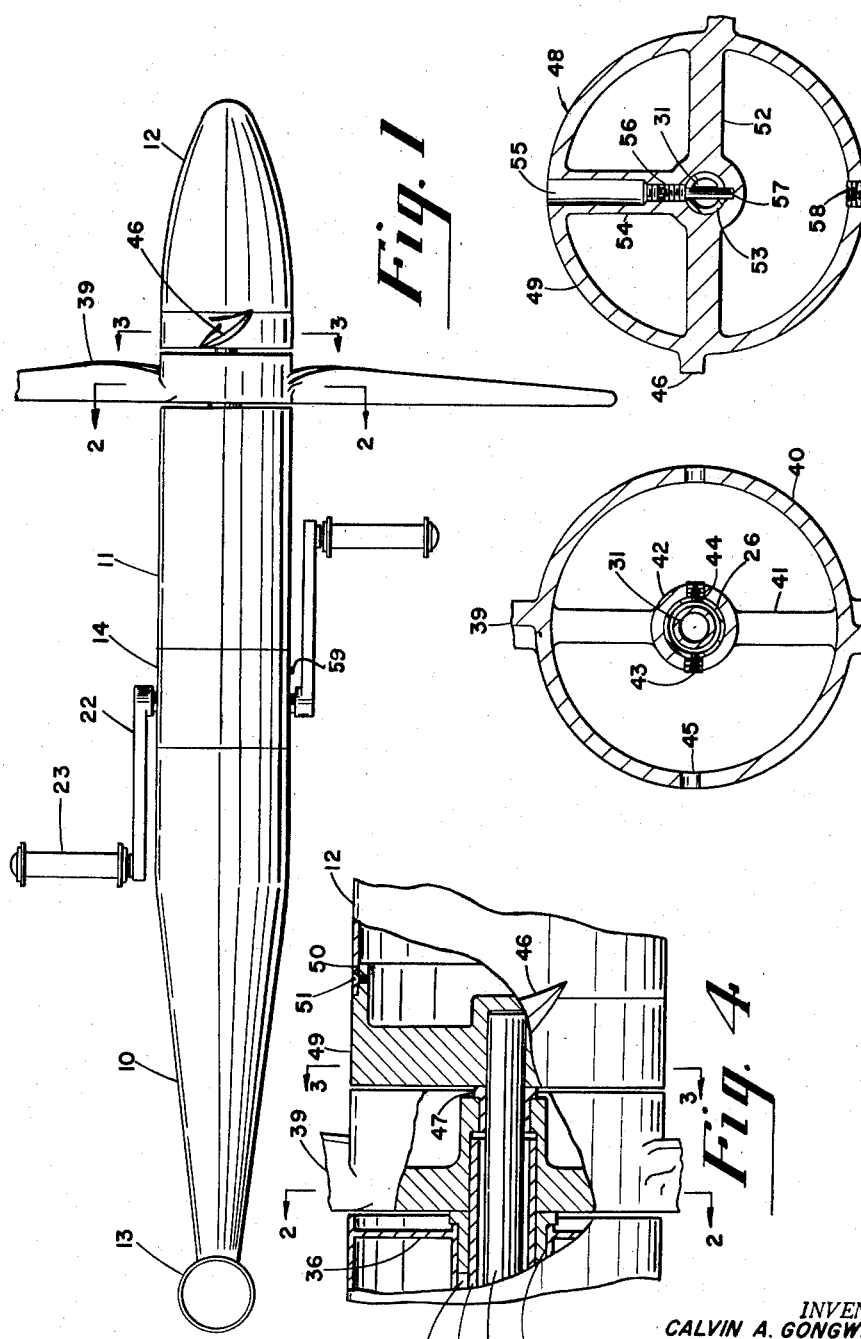

2,843,859

SWIMMER PROPULSION DEVICE

Calvin A. Gongwer, Glendora, and George M. McRoberts III, Sierra Madre, Calif., assignors to Aerojet-General Corporation, Azusa, Calif., a corporation of Ohio Application October 12, 1953, Serial No. 385,488

4 Claims. (Cl. 9—18)

This invention pertains to swimmer propulsion devices in which propellers may be rotated by operation of a person's arms or legs.

An object of this invention is to provide a device which permits a swimmer to attain speeds through the water higher than those which can be reached with conventional swimming aids such as fins or single propeller devices, and which permits the energy expended by the swimmer to be more fully utilized, thereby increasing his range and endurance.

Another object is to provide such a propulsion device which reduces torque without additional structure such as inclined vanes and the like.

A feature of this invention resides in a pedal, gear drive, and propeller assembly attached to a frame convenient for a swimmer's use and which converts leg or arm movement of the swimmer to rotation of counter-rotating propellers.

Another feature resides in the use of counter-rotating propellers to eliminate torque on the swimmer and frame.

These and other features of this invention will be fully understood from the following detailed description and the accompanying drawings in which:

Fig. 1 is a plan view, of a swimming device according to the invention;

Fig. 2 is a cross-sectional view taken along line 2—2 of Fig. 1;

Fig. 3 is a cross-sectional view taken along line 3—3 of Fig. 1;

Fig. 4 is a fragmentary elevation partly in cross-section of a rear part of the invention.

Figure 5:
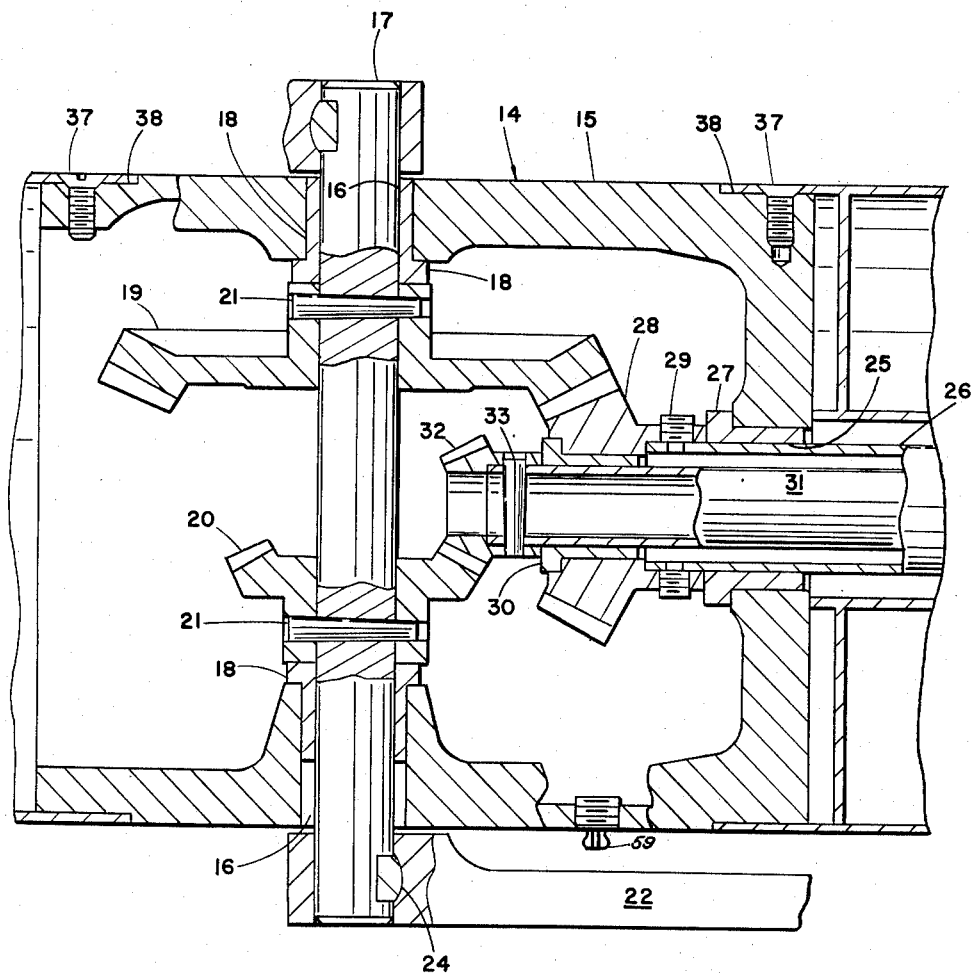
Fig. 5 is a detailed view, in cross-section, of a gear-driving means.

A swimming device incorporating the present invention is shown in Fig. 1. Its general outline is defined by three principal elements, a saddle assembly 10 at the forward end to be straddled by the swimmer, a center section 11, and a tail cone or spinner 12. The saddle has a tube 13 at its forward end to which the swimmer clings with his hands, or to which any desired harness may be attached. The saddle, center section, and cone may be "streamlined" so as to present a minimum of resistance to the passage of the device through the water, and provide a frame for the device.

A gear drive assembly 14 (Fig. 5) is disposed between the saddle and center section and comprises a hollow housing 15 having two diametrically opposed bores 16 pierced by a circular gear shaft 17. Two bushings 18 surround the shaft and bear against the inside of the housing, permitting the shaft to rotate freely in the bores.

An outer-shaft drive gear 19 having bevelled gear teeth surrounds the gear shaft within the housing on one side of the center line of the device, with its teeth facing toward that centerline. An inner-shaft drive gear 20 has similarly bevelled teeth which are closer to the gear shaft than those of the outer-shaft drive gear, and which face the teeth of that gear. These gears are prevented from rotating relative to the shaft by tapered pins 21 which pass through aligned holes in the gears and the shaft.

The shaft and gears are rotated by means of a crank 22 and a pedal 23 fixed to the shaft by means of a crankpin 24. These pedal assemblies are affixed to the gear shaft outside the frame, one on each side.

Two coaxial shafts extend axially and rearward through a bore 25 in the housing. The outer shaft 26 rotates within a bushing 27 in that bore. A pinion gear 28 meshes with the outershaft drive gear 19, the pinion being held in place on the end of the outer shaft by dogs 29, threading into the pinion and projecting into holes in the shaft 26. A further bushing 30 separates the outer shaft 26 from the inner shaft 31, permitting the shafts to rotate freely relative to each other. A second smaller pinion 32 is fastened to the inner end of shaft 31 by a tapered pin 33, and meshes with the inner shaft drive gear 20.

It will now be seen that rotation of the crank arms 22 will cause the inner and outer shafts 31 and 26 to rotate in opposite directions.

From the housing, the shafts extend rearward toward the propellers. At the rear end of the center section, the outer shaft is supported and steadied by a bushing 34 inserted into a tunnel 35 formed by metal members 36 within the center section. If desired, the regions within the center section, saddle and tail cone may be made water tight so as to make those sections buoyant, thereby counteracting, to any desired degree, the weight of the mechanism. The saddle, center section, and gear drive assembly are joined by slipping the saddle 10 and center section 11 over shoulders 38 on the gear drive assembly 14 and inserting screws 37 through them into the shoulder, forming a smooth and uninterrupted surface.

Fig. 2 illustrates the means by which the forward propeller 39 is attached to the outer shaft 26. The propeller extends radially outward from a circular hub 42 which has a transverse member 41 with a circular center portion tapped by two threaded channels 44. Dogs 43 are screwed into the channels and project into holes in the shaft 26 thereby securing the hub and shaft to each other. Access holes 45 in the hub permit the slotted dogs to be installed and tightened.

Fig. 3 illustrates the attachment of the rearward propeller 46 to the inner shaft 31. This inner shaft 31 is supported inside the outer shaft 26 by bushing 47 which bears against the transverse member of hub 42. The hub 48 to which the rearward propeller blades 46 are attached has a flange 49 about its periphery, and a shoulder 50 on that flange to which the spinner cone 12 may be affixed by screws 51. This hub has a transverse member 52 at the center, and it has a partially threaded central bore 55 into which a screw 56 is inserted through an aligned bore 57 in the inner shaft 31. A grease fitting 59 pierces the side of the gear housing, and the inside of the housing is filled with grease to lubricate the moving parts, and to lessen their contact with water. After each use of the mechanism, a grease gun should be connected to the fitting, and a quantity of grease forced into the housing. This action assures a packed housing, and also expels lubricant through bearing surfaces, aiding in cleaning them of water which may have seeped in, providing lubrication for the next use, and retarding corrosion. In order to drain any water which may leak into the tail spinner, a plug 58 is provided in the flange 49 which may be removed for that purpose.

In operation the swimmer or user straddles the device. If a harness, such as straps extending over the shoulders are to be used, they are then put in place and hooked to tube 13. Then the user places his feet on the pedals 23 and operates them as though the device were a bicycle. This causes the shafts and propellers to rotate in opposite directions, resulting in a nearly complete absence of torque, such as results from the use of propellers, all of which rotate in the same direction. As mentioned above, by making the sections water-tight, the weight of device may be substantially counteracted by the buoyance of the sections, depending, of course, on the relative weights and sizes of the various components.

By use of this device, propulsive efficiencies at least five times as great as those attainable with swim fins and the like have been achieved. Maneuvering is accomplished by bending the body at the waist or using the hands as vanes. The propellers are selected for the pitch and area, and the gears for the rotational speed, which provide the best conversion of muscular effort to propulsive action. This device is very useful with a breathing tank or lung, such as may be strapped to the swimmer's back. For a given speed through the water, the metabolic rate of the swimmer is improved over that resulting from the use of conventional swim aids, thereby increasing the range and endurance of the swimmer.

It will be recognized that modifications may be made within the scope of this invention. For example, the pedals at the forward end may be placed so that the hands instead of the feet provide the propulsive force. Alternately sets of pedals may be placed in tandem so that both the hands and feet may be used. My invention is not to be limited to the single embodiment illustrated which is given for illustration rather than limitation and is limited only by the scope of the appended claims.

We claim:

1. A swimmer propulsion device comprising a saddle at its forward end having a streamlined exterior wall converging toward the forward end and having a fluid-tight cavity therein, a center section having a fluid-tight cavity therein and located to the rear of the saddle, a housing located between and joining the saddle and center section, a first hub rotatable relative to the center section and located adjacent to the rear end of said center section, a second hub rotatable relative to said first hub and relative to the housing and located at the rear of said first hub, a tail spinner affixed to said second hub, the saddle, center section, housing, hubs and tail spinner having outer surfaces which are continuous curves, said elements being coaxially assembled to form the device, and presenting an outer streamlined and substantially continuous surface from the saddle to the tail spinner, propellers mounted on each hub, the propellers on one hub being opposite in pitch to the propellers on the other hub, a pair of shafts extending coaxially from the housing to the hubs, each of the shafts being connected to a different one of said hubs, crank and pedal assemblies rotatably mounted to the housing, and driving gear means counter-rotatively interconnecting the shafts with the crank and pedal assemblies, whereby the crank and pedal assemblies counter-rotate the hubs and propellers, only the propellers and crank and pedal assemblies protruding substantially from the outer surface of the device.

2. Apparatus according to claim 1 in which the cross-section of the device is substantially circular throughout its length.

3. Apparatus according to claim 1 in which a gear shaft is rotatably mounted in the housing, and in which the driving means comprises two drive gears spaced apart from each other and mounted on said gear shaft, said drive gears having drive teeth, the drive teeth of the one drive gear facing in a direction opposite the drive teeth of the other drive gear, and a shaft gear on each of the shafts, each shaft gear meshing with a different one of the drive bears.

4. Apparatus according to claim 3 in which the saddle, center section, and tail spinner are filled with a gas whereby the device is rendered more buoyant than a similar device filled with water.

References Cited in the file of this patent

UNITED STATES PATENTS

| 1,728,103 | Chaligne | Sept. 10, 1929 |
| 1,851,513 | Holmstrom | Mar. 29, 1932 |

FOREIGN PATENTS

| 714,083 | France | Aug. 31, 1931 |

UNITED STATES PATENT OFFICE
CERTIFICATE OF CORRECTION

Patent No. 2,843,859                      July 22, 1958

Calvin A. Gongwer et al.

It is hereby certified that error appears in the printed specification of the above numbered patent requiring correction and that the said Letters Patent should read as corrected below.

Column 3, line 23, for "Alternately" read -- Alternatively --.

Signed and sealed this 24th day of February 1959.

(SEAL)

Attest:

KARL H. AXLINE
Attesting Officer

ROBERT C. WATSON
Commissioner of Patents